United States Patent
Speakes

[19]
[11] Patent Number: 5,871,172
[45] Date of Patent: Feb. 16, 1999

[54] ACCESSORY MOUNTING ASSEMBLY

[75] Inventor: Dale M. Speakes, Auburn, Wash.

[73] Assignee: Creative Aeronautical Accessories, Inc., Bellevue, Wash.

[21] Appl. No.: 719,696

[22] Filed: Sep. 26, 1996

[51] Int. Cl.[6] .................................................... B64C 1/00
[52] U.S. Cl. ........................................................... 244/1 R
[58] Field of Search ........................... 244/118.1, 118.5, 244/129.1, 1 R, 122 R; 296/63, 65.1, 64; 297/452.2, 452.18, 423.38; 248/519, 538, 425

[56] References Cited

U.S. PATENT DOCUMENTS

| | | | |
|---|---|---|---|
| 3,391,960 | 7/1968 | Megargle et al. | 296/64 |
| 3,642,320 | 2/1972 | Ward | 297/423.38 |
| 4,148,524 | 4/1979 | Guyton | 297/423.38 |
| 4,425,863 | 1/1984 | Cutler | 297/423.38 |
| 4,456,206 | 6/1984 | Tijssen | 244/118.5 |
| 5,209,430 | 5/1993 | Wilson et al. | 244/17.11 |
| 5,556,164 | 9/1996 | Cindea et al. | 297/423.38 |
| 5,685,517 | 11/1997 | Salibra | 248/519 |

*Primary Examiner*—Charles T. Jordan
*Assistant Examiner*—Tien Dinh
*Attorney, Agent, or Firm*—Seed & Berry LLP

[57] ABSTRACT

An accessory mounting assembly for use in a helicopter, the assembly comprising a fitting for attachment to the helicopter in place of or in conjunction with a tail rotor pedal assembly on the flight deck of the helicopter, a post slidably engaged within a large bore in the fitting, and retained in position by a retaining pin. A platform on the second end of the post is used for supporting optional equipment and accessories. Alternatively, additional posts may be interchanged with the post for specialized applications.

5 Claims, 4 Drawing Sheets

ACCESSORY MOUNTING ASSEMBLY

TECHNICAL FIELD

The present invention pertains to devices for mounting accessories on the floor and flight decks of aircraft, and more particularly, to an accessory mounting assembly configured for mounting in conjunction with or in place of the tail rotor pedal assembly on the Bell Helicopter Model Series 206 and 407 aircraft. The device MAY BE utilized on other models or manufacturers' aircraft, but it may require attachment to other airframe structures.

BACKGROUND OF THE INVENTION

Rotary wing aircraft, primarily helicopters, are used to perform a variety of aerial tasks. Helicopters' capabilities are to lift and transport people or cargo where a runway is not available, and to serve as platforms for mounting equipment necessary to specific job requirements. Examples include aerial photography, surveillance, scientific research, military applications, and law enforcement operations. In some of these applications, the helicopter may be required to hover for extended periods of time. Specialized flight equipment and aircraft after-market accessories are frequently used to enhance the aircraft's unique working capabilities. Such apparatus assist in accomplishing the specified flight mission objectives and help the flight crew perform functions that are beyond the capabilities of other less versatile aircraft. Examples of such specialized equipment and accessories include tables, cameras, monitors, aerial data recording equipment, and the like.

Due to space and structural constraints, as well as weight restrictions, a limited amount of locations are available on a helicopter for mounting optional equipment. In addition, mounting devices and their attachment method must meet governmental (Federal Aviation Administration) regulations regarding the load sustaining capability of such devices during flight operations. Finally, such mounting devices must not compromise the integrity of the structural strength of the aircraft fuselage or interfere with the aircraft's flight controls.

SUMMARY OF THE INVENTION

The present invention is directed to an accessory mounting assembly for attachment to a strong, stable area of the cockpit or cabin floor within a helicopter. The present invention ideally attaches to the cockpit floor deck area containing the tail-rotor control pedals assembly mounting attachment points. These mounting points consist of threaded inserts being contained within the fuselage floor structural members. The assembly comprises a base member having a main body portion with a top surface and a bottom surface. The main body portion further includes a bore formed therein, the bore opening to at least the top surface of the main body portion, and, ideally, to the bottom surface of the main body portion. The area of the main body portion where the bore is placed is in the thickest mass region of the main body portion. This largest bore is placed between three smaller bores described below.

The base member, or floor fitting, further includes at least two and preferably three other openings formed in at least two and preferably three mounting legs. Ideally, two of the three mounting legs extend from the main body, the third leg being part of the main body and opposite to the aforementioned two legs on the opposite side of the large bore. The large bore is positioned forward of the third leg opening, near the center of the main body portion. The first leg and second leg openings are formed in the main body portion aand are positioned on the opposite side of the large bore from the previously noted third leg opening. An area between the first leg and second leg is removed to form a V-shaped space in the main body portion. The three leg openings are positioned to be in alignment with a corresponding attachment point in the helicopter floor structure material, and each opening having associated with it means for supporting the base member on the attachment points and for holding the main body portion above the floor, thus enabling fasteners to pass through and attach the base member to the fuselage frame as well as to allow clearance over existing structure and to enable a mounting post to project therethrough.

In accordance with another aspect of the present invention, embossments are formed on the bottom surface around or adjacent to the leg openings to thereby elevate the base member when it is attached to a fuselage structure.

In accordance with still yet another aspect of the present invention, the assembly further comprises an accessory member that is elevated to be positioned above the floor of the aircraft's cockpit. This includes a post member for elevating the accessory above the floor fitting attached to the fuselage floor body structure; the post member having a first end sized and shaped to be slidably engaged within the large bore of the floor fitting, and a second end configured to support desired accessories; and a securing device to secure the post member to the base member, thereby preventing the post member from becoming unintentionally disengaged from the base member.

In accordance with yet a further aspect of the present invention, the large bore opens to both the top surface and a bottom surface of the main body portion of the fitting to enable the post to project through the bottom surface of the main body.

In accordance with another aspect of the present invention, a pair of the legs slope downward from the main body portion to the openings formed at the end of each leg, thus providing weight reduction and clearance for preexisting structural or assembly members and flight controls.

As will be readily appreciated from the foregoing description, the present invention provides a unique mounting assembly that can be attached to existing "hard" attachment points on a helicopter fuselage floor body structure. The present invention permits attachment of the floor fitting at the tail rotor pedal assembly mounting points for the copilot or pilot in such a way as to replace the existing pedal assembly or to be used in conjunction with the pedal assembly. The unique configuration of the fitting avoids interference with flight controls. A simple release of the securing device permits interchanging of accessories and facilitates easy installation and removal of the post while the fitting remains attached to the cockpit floor.

BRIEF DESCRIPTION OF THE DRAWINGS

The foregoing and other features and advantages of the present invention will be more readily appreciated as the same becomes better understood from the accompanying description when taken in conjunction with the following drawings, wherein.

DETAILED DESCRIPTION OF THE INVENTION

Figure 1:
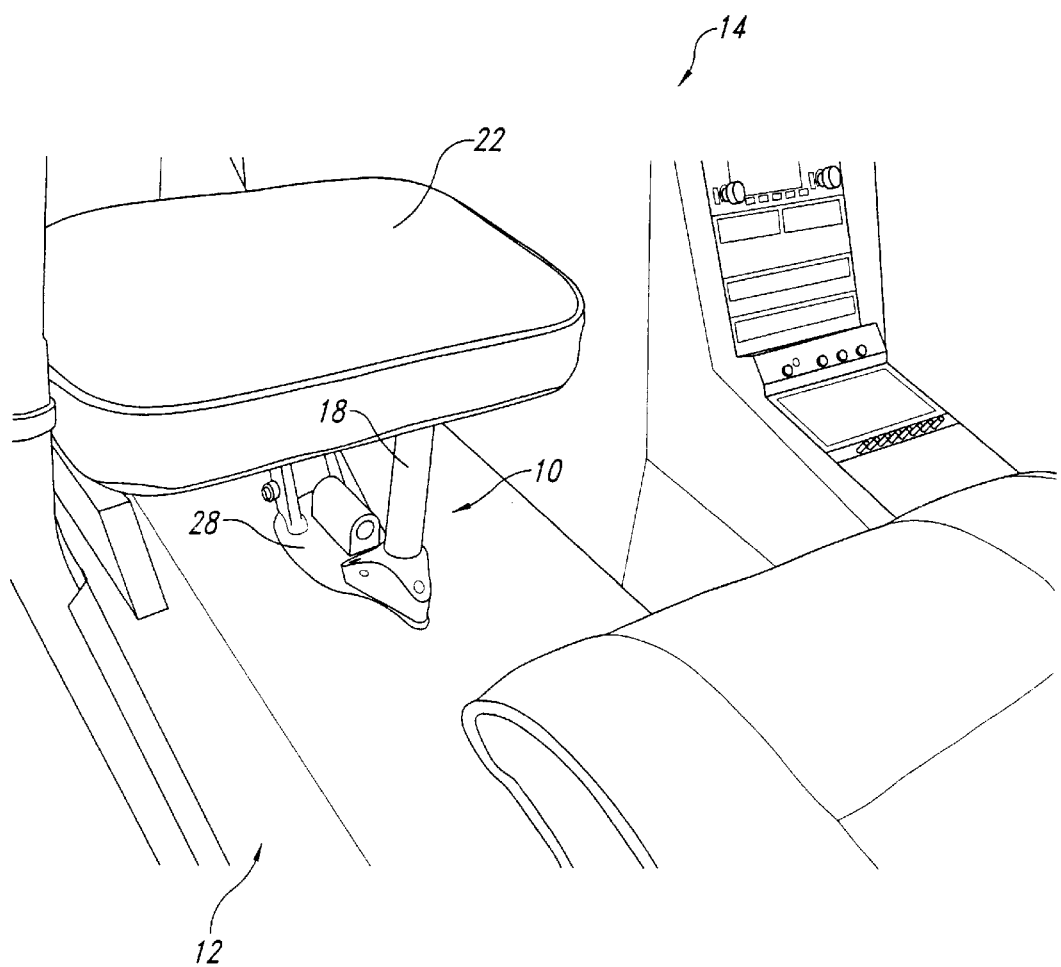
FIG. 1 is an isometric projection of an accessory mounting assembly formed in accordance with the present invention installed on the flight deck of a helicopter.

Referring to initially to FIG. 1, illustrated therein is an accessory mounting assembly 10 formed in accordance with the present invention as installed on the flight deck 12 of a Bell Helicopters Textron, Inc., Model 206 and 407 series helicopter 14. The assembly 10 consists of a machined aluminum fitting mount 16 having a cylindrical post 18 attached thereto by means of a retaining pin 20. The post 18 is configured to support equipment and accessories, such as an ottoman 22 depicted in FIG. 1.

Figure 2:
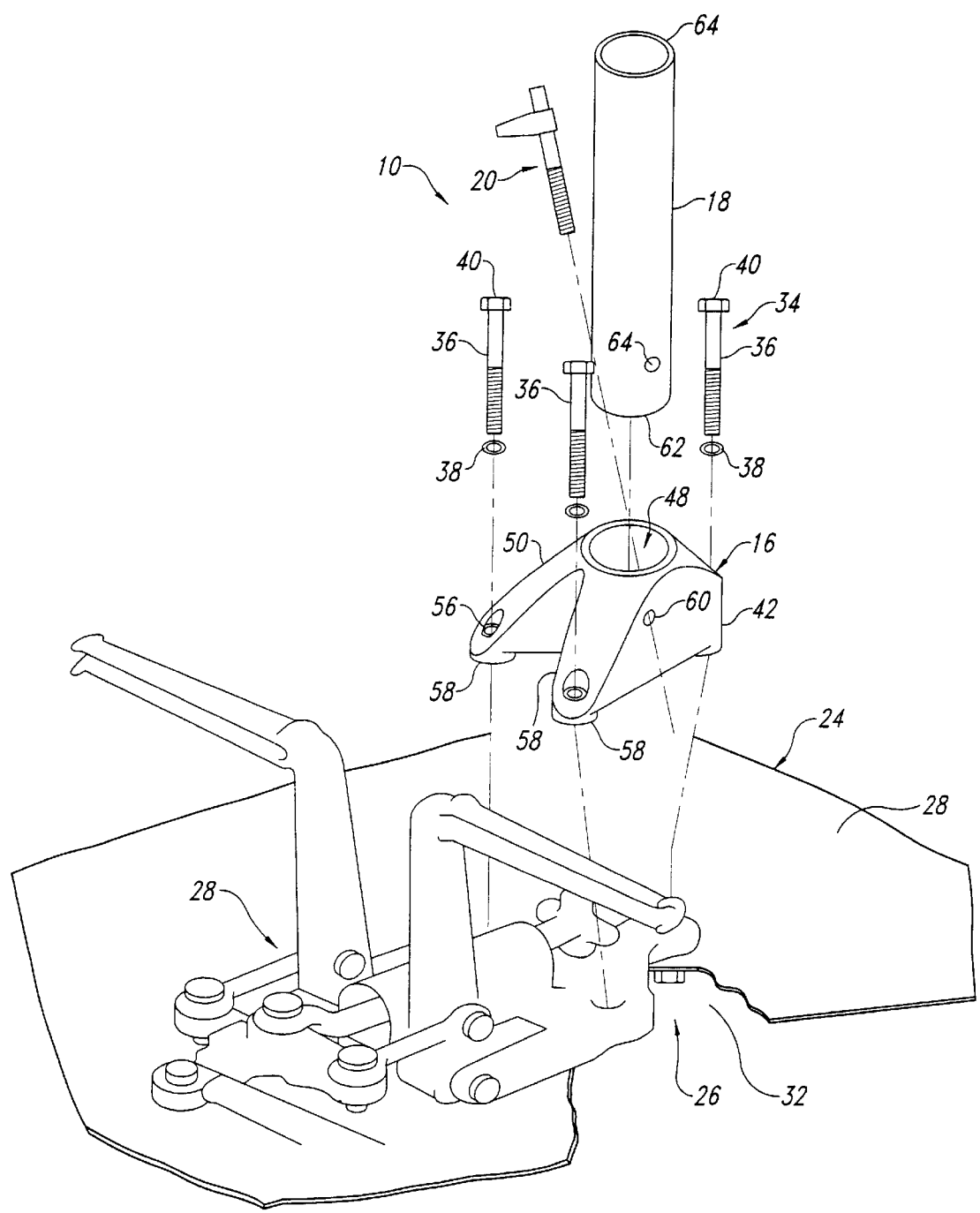
FIG. 2 is an exploded isometric projection of the assembly formed in accordance with the present invention.
Figure 3:
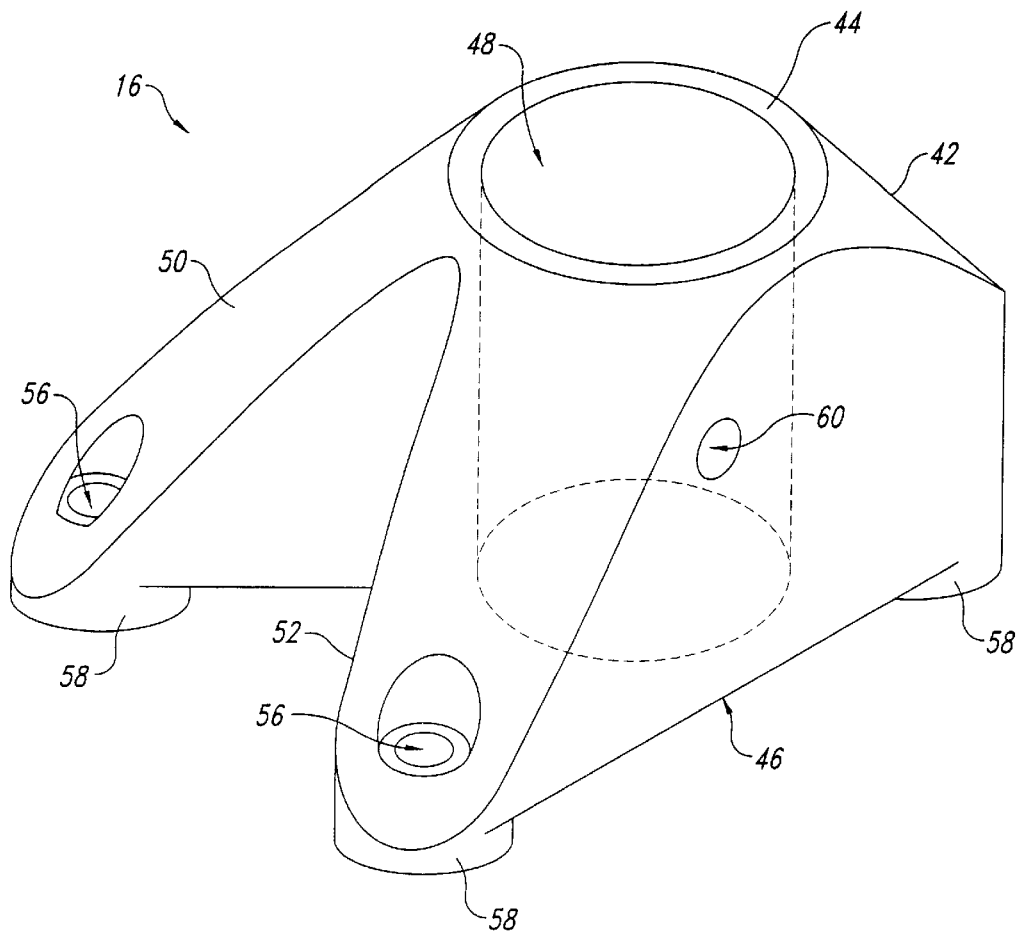
FIG. 3 is an isometric projection of a fitting mount formed in accordance with the present invention.
Figure 4:
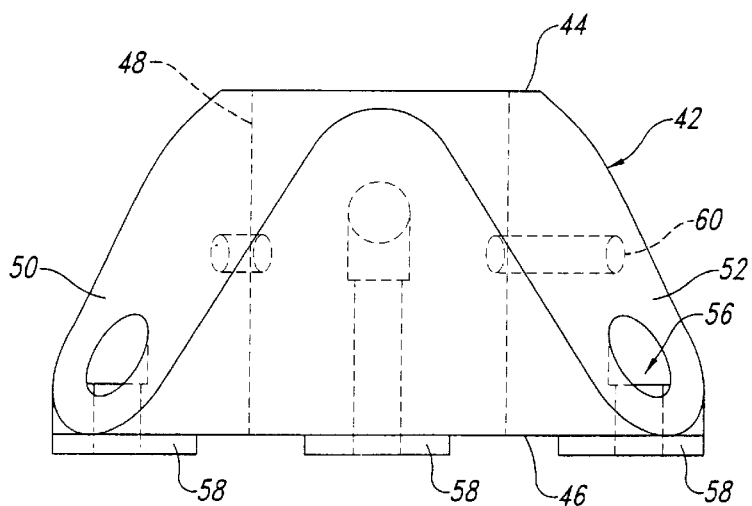
FIG. 4 is a front plan view of the fitting of FIG. 3.
Figure 5:
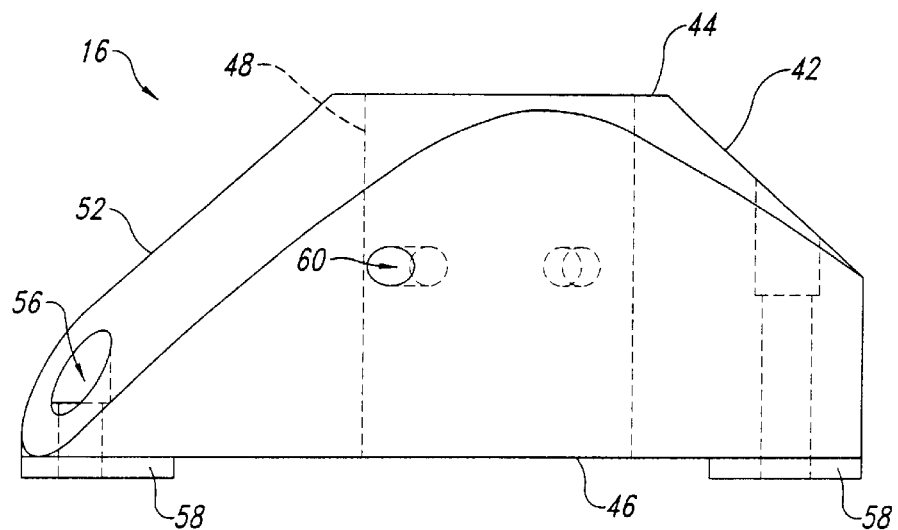
FIG. 5 is a side plan view of the fitting of FIG. 3.
Figure 6:
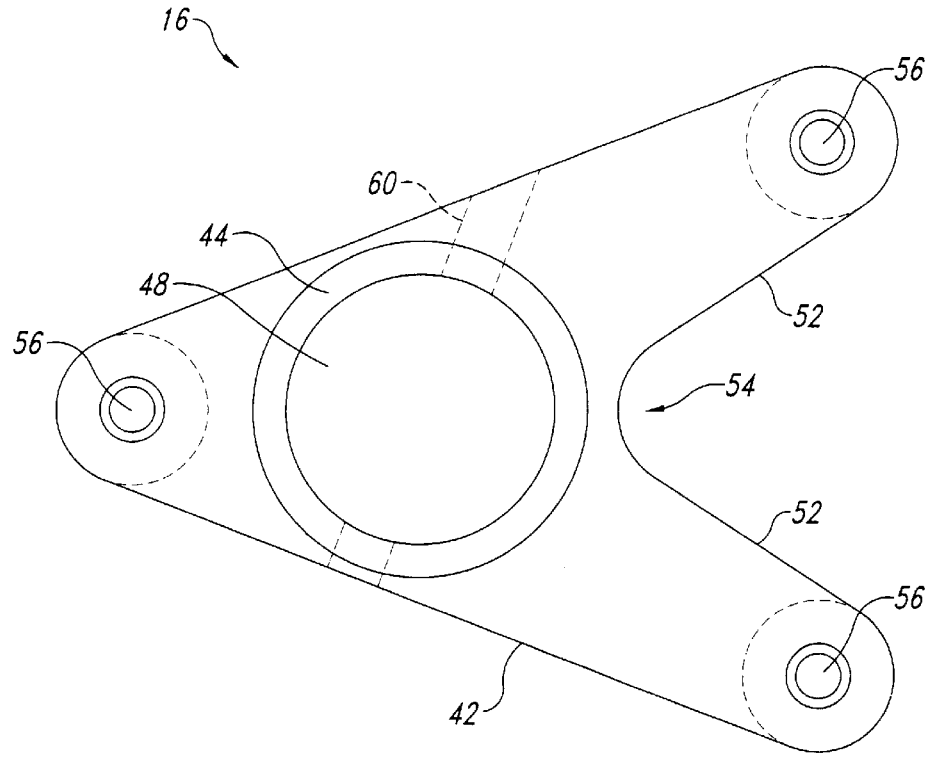
FIG. 6 is a top plan view of the fitting of FIG. 3.

As shown more clearly in FIG. 2, the helicopter 14 includes a structural member 24 having attachment points 26 formed thereon for attaching equipment and structural members, such as a pilot's tail rotor pedal assembly 28 attached to a floor member 30, and the like. The attachment points 26 typically comprise threaded nut inserts 32 bonded to the frame member 24 during the manufacture of the helicopter. The tail rotor pedal assembly 28 is thus attached to the attachment points 26 by means of threaded fasteners 34, in this case a bolt 36 and a washer 38 under the bolt head 40. It is to be understood that the invention can be adapted for use on the flight decks of other rotary wing craft, and that the helicopter shown herein is for illustration purposes only.

Referring next to FIGS. 3–6, the fitting 16 shown therein has a main body 42 with a top surface 44 and an opposing bottom surface 46. A large bore 48 is formed in the main body 42, preferably by a machining, which ideally has its longitudinal axis at 90° to the top surface 44 and opens to the top and bottom surfaces 44 and 46. Alternatively, the bore 48 could be formed to open only to the top surface 44. However, because the fitting 16 must have a low profile and weight, and yet be strong enough to support heavy loads exerted by a load at the top of the post 18, the bore 48 preferably opens to the bottom surface 46, thus allowing the post 18 to protrude through. As such, the supporting point for the post 18 is effectively raised higher, reducing the strain on the post 18.

The main body 42 has a pair of legs 50 and 52 integrally formed therewith and protruding radially outward from one side. Thus, the legs have a V-shaped space 54 formed between them, as shown in the top plan view of FIG. 6. The legs 50 and 52 are sized to provide support for the main body 42 and extend out to the attachment points 26 on the helicopter. Openings 56 are formed in the fitting 16, i.e., one each in the legs 50 and 52, and one in the main body 42, which are sized and positioned to allow fasteners 34 to pass through and connect to the attachment points 26. The fitting 16 is thus firmly attached to the helicopter 14. Preferably a bolt 36 and washer 38 are used for fastening at each of the attachment points 26.

The fittings 16 can be mounted over the existing tail rotor pedal assembly 28 by using bolts with a longer grip length, or the fitting 16 can be used in place of the tail-rotor pedal assembly 28 using the existing fasteners 34. To insure there is sufficient clearance between the bottom surface 46 of the fitting 16 and the floor member 30, and to elevate the supporting point on the post 18, thus reducing the strain on the lower portion of the post 18, the fitting 16 is raised up on the attachment points 26 by embossments 58. These embossments 58 are formed on the bottom surface 46 of the fitting 16 and adjacent to each of the openings 56. Ideally, the embossments 58 surround the openings 56.

A small bore 60 is formed transversely through the main body 42, which intersects the large bore 48. The small bore 60 is sized to receive the retaining pin 20. Ideally, the retaining pin 20 is a clevis pin approved for aircraft use. This pin 20 secures the post 18 to achieve vertical fastening security. In other words, the pin 20 maintains the post 18 in positive engagement with the fitting 16 and prevents unintentional disengagement in any orientation, including an inverted attitude.

The post 18 has a first end 62 that is sized and shaped to be slidably received within the large bore 48 in the main body 42 of the fitting 16. The post further includes a second end 64 that is configured to hold accessories, in this case the platform 22. Multiple posts may be designed for specific purposes and used interchangeably with the fitting 16. Ideally, the post 18 is a hollow cylinder and includes a small opening 64 at the first end 62 to enable the retaining pin 20 to pass through.

Preferably, the fitting 16 is machined from a single block of aircraft grade aluminum, although other materials may be used so long as they meet aircraft standards. The assembly 10 must be tested and certified according to current Federal Aviation Administration certification requirements. In addition, each accessory post will have to be tested and a placard placed thereon indicating the specific load limits.

The accessory mounting assembly 10 provided by the present invention thus utilizes an interchangeable support post 18 to provide a mounting platform 22 for the flight crew or flight crew usable accessories. In use, the first end 62 of the post 18 is slidably engaged into the fitting 16. The assembly 10 described herein provides for a simple securing device. A one-piece retaining pin 20 that meets the requirement for suitable security of the support post 18, i.e., a clevis pin, passes through both the fitting 16 and the support post 18 to achieve vertical fastening security and facilitates interchangeability of the posts 18.

While a preferred embodiment of the invention has been illustrated and described herein, it is to be understood that various changes may be made therein without departing from the spirit and scope of the invention. Consequently, the invention is to be limited only by the scope of the claims that follow.

The embodiments of the invention in which an exclusive property or privilege is claimed are defined as follows:

1. An accessory mounting assembly for supporting accessories on a flight deck of a helicopter, the flight deck having tail rotor control pedals and a floor member mounted to attachment points on a fuselage frame, the assembly comprising:

a base member formed from a single block of metal having a main body portion with a top surface and a bottom surface, the main body portion having a bore formed therein, the bore opening to at least the top surface and the bottom surface of the main body portion, the base member further including two leg members integrally formed with the main body portion and extending therefrom for supporting the main body portion, the main body portion and two legs each including at least one opening formed therein and positioned to be in alignment with the attachment points to enable fasteners to pass therethrough and attach the base member to the fuselage frame;

means for elevating the base member above the helicopter floor member when the base member is attached to the attachment points on the fuselage frame;

a single post having a first end sized and shaped to be inserted in the bore through the top surface of the base member and to protrude beyond the bottom surface and a second end configured to support accessories thereon; and means for releasably securing the post to the base member to thereby prevent the post from becoming unintentionally disengaged from the base member.

2. The assembly of claim 1, wherein the base member is formed from a single block of aircraft grade aluminum and the means for elevating the base member comprises embossments formed on the bottom surface around each of the openings in the main body portion and two legs.

3. In a helicopter having a flight deck with a floor, the floor being supported by a plurality of fuselage frame members that include attachment points formed thereon for receiving fasteners to hold various objects, including a copilot's tail rotor pedal assembly, the improvement comprising:

A fitting for attachment to the copilot's tail rotor pedal assembly attachment points, the fitting being formed from a single block of metal to have a unitary main body portion with two legs depending therefrom, the main body portion having a bore formed therein that opens to a top surface and a bottom surface of the fitting, the two legs forming a V-shaped space sized and shaped to fit around protrusions on the copilot's tail rotor pedal assembly, each leg and the main body portion each having at least one opening formed therein that opens to the top and bottom surface's of the fitting and that is positioned to be in alignment with at least one attachment point on the helicopter fuselage frame members, each opening having associated with it on the bottom surface of the fitting a means for supporting the fitting on the attachment points and for elevating the main body portion above the helicopter floor; a single post having one end sized and shaped for slidable engagement through the bore; and means for retaining the post in releasable engagement with the main body portion and preventing unintentional disengagement of the post.

4. The assembly of claim 3, wherein the post has an opposing end configured to hold optional equipment and accessories and further wherein the retaining means holds the post with the one end protruding beyond the bottom surface of the fitting.

5. The assembly of claim 4, wherein the retaining means comprises a pin that is slidably engageable within an opening in the main body portion that intersects with the bore and further is slidably engageable within an opening formed in the post.

* * * * *